(12) United States Patent
Oosaki (10) Patent No.: US 8,305,662 B2
(45) Date of Patent: Nov. 6, 2012

(54) IMAGE READING DEVICE, METHOD, AND COMPUTER READABLE MEDIUM FOR THE SAME

(75) Inventor: Masayoshi Oosaki, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 273 days.

(21) Appl. No.: 12/782,306

(22) Filed: May 18, 2010

(65) Prior Publication Data

US 2011/0075233 A1     Mar. 31, 2011

(30) Foreign Application Priority Data

Sep. 30, 2009    (JP) .................................. 2009-227898

(51) Int. Cl.
     *H04N 1/46*      (2006.01)
     *G03F 3/08*      (2006.01)

(52) U.S. Cl. ......... 358/505; 358/501; 358/509; 358/518

(58) Field of Classification Search ........................ None
See application file for complete search history.

(56) References Cited

U.S. PATENT DOCUMENTS

| 2004/0223192 A1 | 11/2004 | Hiromatsu et al. |
| 2008/0316544 A1 | 12/2008 | Hiromatsu et al. |

FOREIGN PATENT DOCUMENTS

| JP | 6-339149 | 12/1994 |
| JP | 2003-60911 | 2/2003 |
| JP | 2005-20239 | 1/2005 |
| JP | 2005-167690 | 6/2005 |
| JP | 2007-336454 | 12/2007 |
| JP | 2008-227825 | 9/2008 |

*Primary Examiner* — Thierry Pham
(74) *Attorney, Agent, or Firm* — Scully, Scott, Murphy & Presser, PC (57) ABSTRACT

An image reading device comprising: a carrying unit; a reading unit; a first obtaining unit to obtain a first value representing a ground color of a first face of the document; a first judgment unit to judge whether to execute correction for the ground color of the first face; a first correction unit to correct the ground color of the first face; a second obtaining unit to obtain a second value representing a ground color of a second face of the document; a second judgment unit to judge whether the second value falls within a predetermined range including the first value; a third judgment unit to judge whether to execute correction for the second face of the document in accordance with a judgment result by the first judgment unit if the second judgment unit judges that the second value falls within the predetermined range; and a second correction unit.

12 Claims, 5 Drawing Sheets

FRONT FACE

GROUND COLOR

GROUND COLOR DENSITY VALUE D2 →

OUTPUT IMAGE

GROUND COLOR

FIG.5B

BACK FACE

GROUND COLOR

GROUND COLOR DENSITY VALUE D1 →

OUTPUT IMAGE

GROUND COLOR

FIG.5C

IMAGE READING DEVICE, METHOD, AND COMPUTER READABLE MEDIUM FOR THE SAME

CROSS-REFERENCE TO RELATED APPLICATION

This application claims priority under 35 U.S.C. §119 from Japanese Patent Application No. 2009-227898, filed on Sep. 30, 2009. The entire subject matter of the application is incorporated herein by reference.

BACKGROUND

1. Technical Field

Aspects of the present invention relate to an image reading device.

2. Related Art

Image reading devices configured to execute a correction process (hereafter, referred to as ground color correction) for removing a ground color of a document by processing image data read from the document have been proposed. One of such image reading devices configured to read both sides of a document at a time with two CISs (Contact-type Image Sensors) is capable of executing the ground color correction for both sides of the document. In such a image reading device, a value (hereafter, a ground color density value) representing a ground color of a document is obtained from the image date read from the document, and when the ground color density value is larger than or equal to a predetermined threshold value, the ground color of the document is corrected by multiplying each pixel value of the image data by a correction factor (255/(ground color density value)).

SUMMARY

Incidentally, regarding the image reading device having two CISs for respectively reading both sides of a document, ground color density values read from the both sides of the document may become different from each other due to, for example, a difference between properties of the two CISs, or fluctuations of the ground color density values caused by the difference between postures of the document during reading processes, regardless of the fact that the ground colors of the both sides of the document are equal to each other.

Figure 5A:
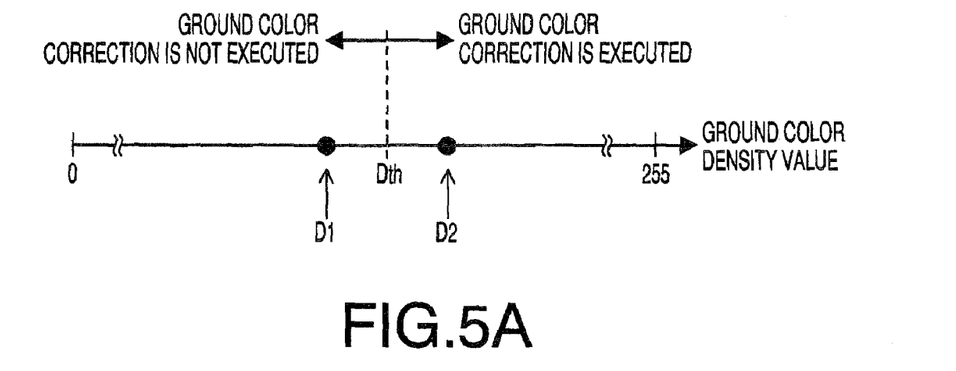
FIGS. 5A-5C are explanatory illustrations for explaining a problem caused when the front face and the back face of the document are read independently by different CISs.
Figure 5B:
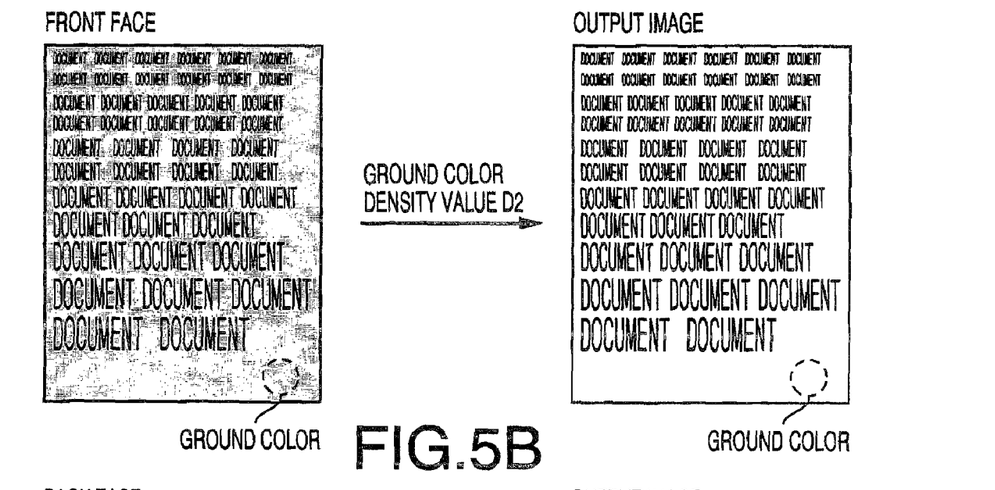
Figure 5C:
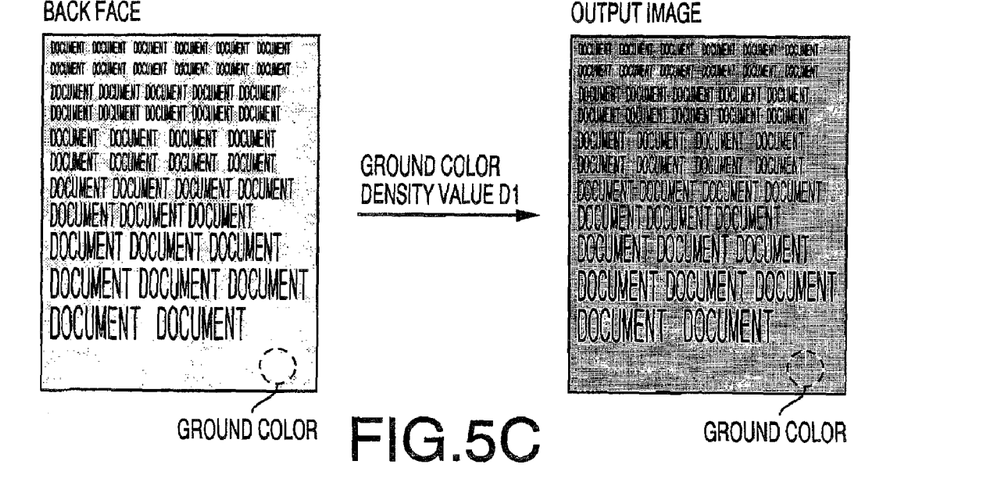

FIGS. 5A, 5B and 5C illustrate such a situation where different ground color density values are obtained from both sides of a document regardless of the fact that the ground colors of the both sides of the document are equal to each other. FIG. 5A shows a situation where two CISs respectively read the ground colors of the both-sides of the document which are equal to each other but are close to a predetermined threshold value Dth. In this situation, due to the above described reasons, the ground color density value D2 larger than or equal to the threshold value Dth is obtained for the front-face of the document and the ground color density value D1 smaller than the threshold value Dth is obtained for the back-face of the document. In this case, the ground color correction is executed for the image data for the front-face of the document, but the ground color correction is not executed for the image data for the back-face of the document. As a result, background colors of both sides of an output image (an output recording medium) become different from each other regardless of the fact that the ground colors of the both sides of the document are equal to each other.

The above described undesirable results may also occur in the case where both sides of a document is read with a single CIS by reversing the document on a paper carrying path or in the case where a both-side printing process is executed from single-side documents by reading sequentially two documents with the single CIS to output a double-sided recording medium.

Aspects of the present invention are advantageous in that they provide at least one of an image reading device, a method and a computer readable medium configured to execute appropriately the ground color correction depending on ground colors of both sides of a document when According to an aspect of the invention, there is provided an image reading device, comprising: a carrying unit configured to carry a document; a reading unit configured to read the document being carried by the carrying unit; a first density value obtaining unit configured to obtain a first value representing a ground color of a first face of the document based on image data obtained by the reading unit by reading the first face of the document; a first judgment unit configured to judge whether to execute correction for the ground color of the image data corresponding to the first face of the document based on the first value and a predetermined threshold value; a first ground color correction unit configured to correct the ground color of the image data corresponding to the first face with a first correction value responsive to the first value if the first judgment unit judges to execute the correction; a second density value obtaining unit configured to obtain a second value representing a ground color of a second face of the document based on image data obtained by the reading unit by reading the second face of the document; a second judgment unit configured to judge whether the second value falls within a predetermined range including the first value; a third judgment unit configured to judge whether to execute correction for the ground color of the image data corresponding to the second face of the document in accordance with a judgment result by the first judgment unit if the second judgment unit judges that the second value falls within the predetermined range; and a second ground color correction unit configured to correct the ground color of the image data corresponding to the second face with a second correction value responsive to the second value if the third judgment unit judges to execute the correction. In this configuration, the third judgment unit judges to execute the correction for the ground color of the image data corresponding to the second face of the document if the first judgment unit judges to execute the correction for the ground color of the image data corresponding to the first face of the document, and the third judgment unit judges not to execute the correction for the ground color of the image data corresponding to the second face of the document if the first judgment unit judges not to execute the correction for the ground color of the image data corresponding to the first face of the document.

According to another aspect of the invention, there is provided a method to be implemented on an image reading device; comprising the steps of: obtaining a first value representing a ground color of a first face of a document based on image data obtained by reading a first face of the document; first judging whether to execute correction for the ground color of the image data corresponding to the first face of the document based on the first value and a predetermined threshold value; correcting the ground color of the image data corresponding to the first face with a first correction value responsive to the first value if it is judged in the first judging step that the correction for the ground color of the image data corresponding to the first face should be executed; obtaining a second value representing a ground color of a second face of the document based on image data obtained by reading the second face of the document; second judging whether the second value falls within a predetermined range including the first value; third judging whether to execute correction for the ground color of the image data corresponding to the second face of the document in accordance with a judgment result of the first judging step if it is judged in the second judging step that the second value falls within the predetermined range; and correcting the ground color of the image data corresponding to the second face with a second correction value responsive to the second value if it is judged in the third judging step that the correction for the ground color of the image data corresponding to the second face should be executed. In this configuration, in the third judging step, it is judged that the correction for the ground color of the image data corresponding to the second face of the document should be executed if it is judged in the first judging step to execute the correction for the ground color of the image data corresponding to the first face of the document, and it is judged that the correction for the ground color of the image data corresponding to the second face of the document should not be executed if it is judged in the first judging step not to execute the correction for the ground color of the image data corresponding to the first face of the document.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

DETAILED DESCRIPTION

Hereafter, embodiments according to the invention will be described with reference to the accompanying drawings.

First Embodiment

Figure 1A:
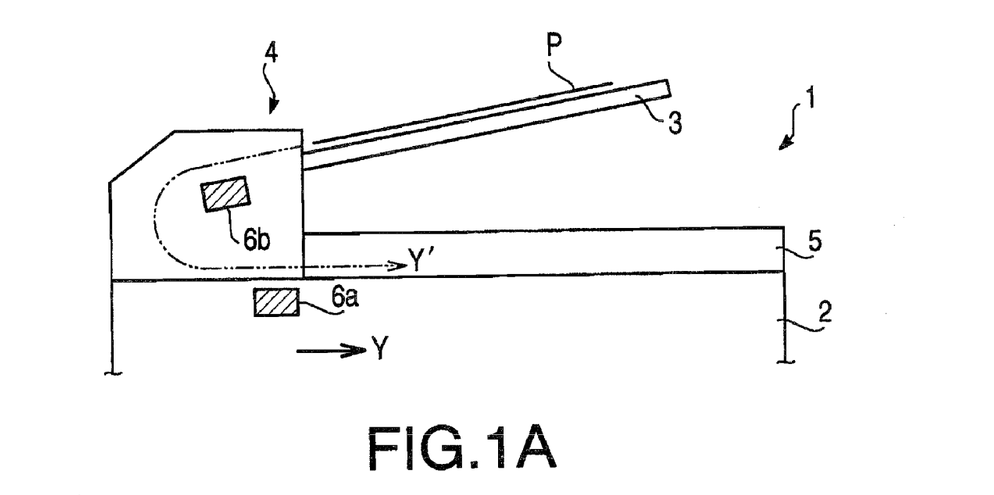
FIG. 1A illustrates a general configuration of a main portion of a multifunction peripheral (MFP) according to an embodiment.

Referring to FIG. 1A, an MFP (multifunction peripheral) 1 according to the embodiment has multiple functions including a printing function, a copying function, and a scanner function.

As shown FIG. 1A, the MFP 1 includes a document base 2 and a document cover 5. With this structure, the MFP 1 functions as a flat bed scanner. The document cover 5 includes a paper feed tray 3, a paper output tray (not shown) and an ADF (Automatic Document Feeder) 4 which carries a document P from the paper freed tray 3 to the paper output tray. Although the MFP 1 includes various types of units such as a printer unit 16 and an operation panel 17, these units are omitted from FIG. 1A for the sake of simplicity.

Further, the MFP 1 includes a 1st reading unit 6a which is arranged to extend in a main scanning direction (i.e., a direction orthogonal to a paper surface of FIG. 1A) under a reading glass (not shown) provided on the document base 2. The 1st reading unit 6a has a CIS (Contact-type Image Sensor) and a light source (e.g., an LED). The 1st reading unit 6a is configured to read a reading face (i.e., a front face) of the document on a line-by-line basis by irradiating the document P with the light source and receiving light reflected from the document P on the CIS.

The 1st reading unit 6a is arranged to be able to reciprocate in an auxiliary scanning direction (i.e., a direction indicated by an arrow Y). When the document P is read in a state where the document P is placed on the document base 2, the reading face of the document P is read on a line-by-line basis while moving the 1st reading unit 6a in the auxiliary scanning direction. When the document P is to be read with the ADF 4, the 1st reading unit 6a is moved to a predetermined position where the 1st reading unit 6a is able to read the document P being carried by the ADF 4, and the reading face of the document P is read on a line-by-line basis while moving the document P along a path indicated by an arrow Y' with the ADF 4.

The MFP 1 further includes a 2nd reading unit 6b having the same configuration as that of the 1st reading unit 6a. As shown in FIG. 1A, the 2nd reading unit 6b is fixed at a position on a downstream side in a paper carrying path with respect to the 1st reading unit 6a. At the arranged position of the 2nd reading unit 6b, the 2nd reading unit 6b is able to read a back face of the document P which is opposite to the reading face of the document P.

Since the two reading units 6a and 6b are provided along the paper carrying path, it is possible to read both sides of the document P at a time while carrying the document P with the ADF 4.

As described in detail later, the MFP 1 is configured such that, for execution of both-side→both-side copy, whether to make a correction with respect to read data (image data) of a ground color of the back face of the document P is decided based on a density value of a ground color obtained by the reading operation of the 2nd reading unit 6b. Then, if a density value of a ground color of the front face obtained by the reading operation of the 1st reading unit 6a falls within a predetermined rang including the density vale of the ground color of the back face, whether to make a correction to the read data of the ground color of the front face is decided in accordance with whether to make a correction to the read data of the ground color of the back face.

On the other hand, if the density value of the ground color of the front face of the document P falls outside the predetermined range, whether to make a correction to the read data of the ground color of the back face is decided based on the density value of the ground color of the back face and a threshold value for determining whether to execute correction for a ground color.

Figure 1B:
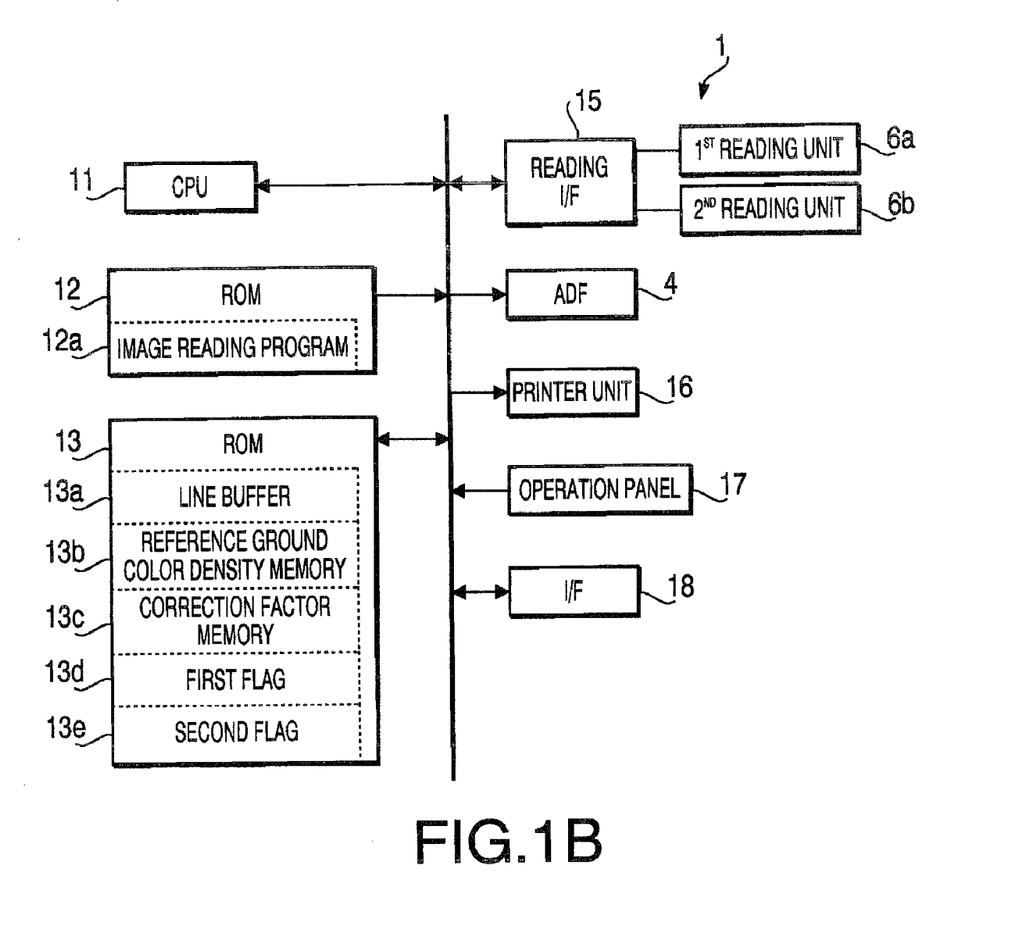
FIG. 1B is a block diagram illustrating a control system of the MFP.

As shown in FIG. 1B, the MFP 1 includes a CPU 11 which executes total control of the MFP 1, a ROM 12 storing various types control programs and fixed data, a RAM 13 storing temporarily data to be used by the CPU 11, an image memory (not shown), a reading interface (I/F) 15, the reading units 16a and 16b connected to the reading interface 15, the ADF 4, the printer unit 16, the operation panel 17 having an operation unit and a display unit (e.g., an LCD), and an interface 18 interfacing the MFP 1 with an external device such as an personal computer.

The MFP 1 executes various operations based on commands inputted, for example, through the operation unit of the operation panel 17. The MFP 1 also executes various operations based on commands inputted through the interface 18 from the external device.

The ROM 12 has an image reading program 12*a* for executing, for example, a both-side→both-side copy process (see FIG. 3). The RAM 13 has a line buffer 13*a*, a reference ground color density memory 13*b*, a correction factor memory 13*c*, a first flag 13*d* and a second flag 13*e*.

The reference ground color density memory 13*b* stores a density value of a ground color obtained from a reference surface of a document. In this embodiment, the back face of the document P is defined as the reference surface. The correction factor memory 13*c* stores a correction factor used to correct a ground color of the read data of the document P.

The first flag 13*d* is a flag indicating whether to execute correction for a ground color with respect to the read data of the reference surface of the document P. The second flag 13*e* is a flag indicating whether to execute correction for a ground color with respect to the read data of the surface of the document opposite to the reference surface. For each of the first flag 13*d* and the second flag 13*e*, a value "1" means that the correction for the ground color is executed and a value "0" means that the correction for the ground color is not executed.

Figure 2:
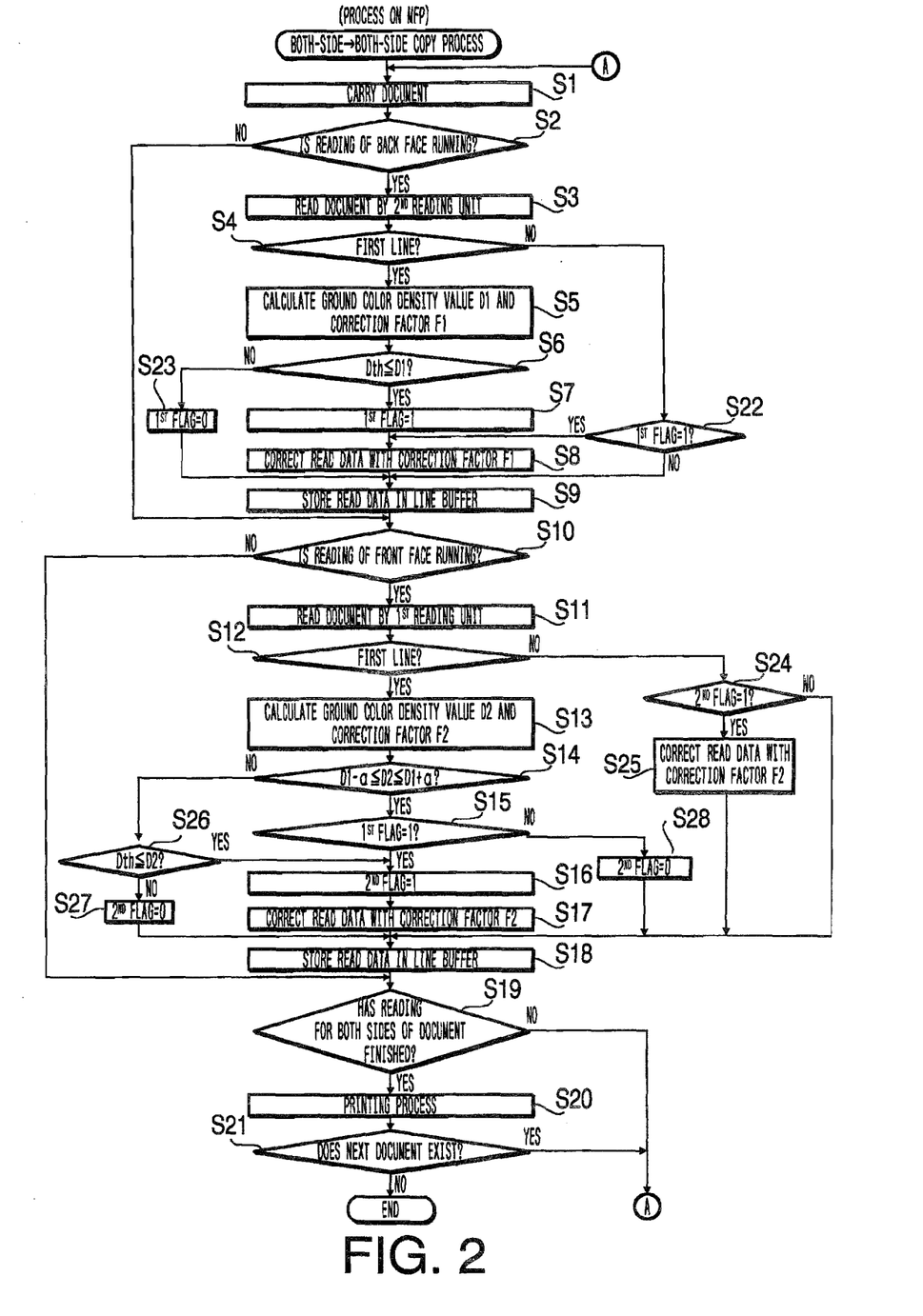
FIG. 2 is a flowchart of a both-side→both-side copy process to be executed under control of a CPU of the MFP.

Hereafter, the both-side→both-side copy process is explained with reference to FIG. 2. As described in detail below, in the both-side→both-side copy process, both sides of the document P being carried by the ADF 4 are read by the reading units 6*a* and 6*b*, and the read data of the both sides of the document P is printed on both sides of a recording medium such as a sheet of paper by the printer unit 16.

The both-side→both-side copy process is started when an execution command for both-side→both-side copy is inputted by a user through the operation panel 17 or an execution command for both-side→both-side copy is inputted from an external device through the interface 18. First, the CPU 11 drives the ADF 4 to start carrying the document P placed on the paper feed tray 3 (step S1). Then, the CPU 11 judges whether the MFP 1 is in the process of reading the back face of the document P (step S2). It should be noted that the words "in the process of reading the back face of the document P" mean a time period between a time when an edge of the document P reaches a reading position of the 2nd reading unit 6*b* and the 2nd reading unit 6*b* starts reading the back face of the document P and a time when the reading of the back face of the document P by the 2nd reading unit 6*b* is finished.

If the reading process of the back face of the document P is running (S2: YES), the CPU 11 reads the back face of the document P for one line through the 2nd reading unit 6*b* (step S3), and judges whether the line read in step S3 is the first line (step S4).

If the line read in step S3 is the first line (S4: YES), the CPU 11 calculates a ground color density value D1 and a correction factor F1 based on the read data of the first line (step S5). The CPU 11 stores the ground color density value D1 calculated in step S5 in the reference ground color density memory 13*b*, as a density value of a ground color of the reference face of the document. Further, the CPU 11 stores the correction factor F1 calculated in step S5 in the correction factor memory 13*c*.

The ground color density value D1 may be obtained by extracting a predetermined number of pixels (e.g., 16 pixels) from all of the pixels on the first line of the read data in decreasing order of density values and by calculating an average of the density values of the extracted pixels. The correction factor F1 may be obtained by dividing the maximum value Dmax (e.g., 255) of the ground color correction value by the ground color density value D1.

Next, the CPU 11 compares the ground color density value D1 with a threshold value Dth (step S6). That is, the CPU 11 judges whether Dth≦D1 holds. If Dth≦D1 holds (S6: YES), the CPU 11 sets the first flag 13*d* to "1" (step S7), and executes the ground color correction by correcting the read data with the correction factor F1 (step S8). Then, the CPU 11 stores the corrected read data in an area of the line buffer 13*a* where the read data of the back face is stored (step S9).

On the other hand, if Dth≦D1 does not hold (S6: NO), the CPU 11 resets the first flag 13*d* to "0" (step S23). Then, control proceeds to step S9. That is, if Dth>D1, the CPU 11 stores the read data obtained by the $2^{nd}$ reading unit 6*b* in an area of the line buffer 13*a* where the read data of the back face is stored, without executing the ground color correction by the correction factor F1.

If the line read in step S3 is not the first line (S4: NO) (i.e., the line read in step S3 is the second or succeeding line, the CPU 11 judges whether the first flag 13*d* is "1" (step S22). If the first flag 13*d* is "1" (S22: YES), control proceeds to step S8 where the CPU 11 corrects the read data with the correction factor F1, and stores the corrected read data in the line buffer 13*a*. If the first flag 13*d* is not "1" (S22: NO), control proceeds to step S9 where the CPU 11 stores the read data which has not been corrected by the correction factor F1 in the line buffer 13*a*.

After step S9 is processed, the CPU 11 judges whether the MFP 1 is in the process of reading the front face of the document P (step S10). The words "in the process of reading the front face of the document" mean a time period between a time when an edge of the document P reaches a reading position of the 1st reading unit 6*a* and the 1st reading unit 6*a* starts reading the front face of the document P and a time when the reading of the front face of the document P by the 1st reading unit 6*a* is finished.

If the reading process of the back face of the document P is not running (S2: NO), control proceeds to step S10 where the CPU 11 judges whether the MFP 1 is in the process of reading the front face of the document P.

If the MFP 1 is in the process of reading the front face of the document P (S10: YES), the CPU 11 reads the front face of the document P for one line through the 1st reading unit 6*a* (step S11). Then, the CPU 11 judges whether the line being read is the first line (step S12). If the line read in step S11 is the first line (S12: YES), the CPU 11 calculates a ground color density value D2 and a correction factor F2 based on the read data of the first line (step S13). The ground color density value D2 and the correction factor F2 can be calculated in similar calculation manners to the ground color density value D1 and the correction factor F1. Then, the CPU 11 stores the correction factor F2 calculated in step S13 in the correction factor memory 13*c*.

Next, the CPU 11 judges whether the ground color density value D2 falls within ground color density value D1±α. For example, if the gray scale of an inputted density is 255 levels, α is approximately 5. That is, the CPU 11 judges whether D1−α≦D2≦D1+α is satisfied (step S14). In other words, in step S14, the CPU 11 judges whether the ground color of the front face of the document P (ground color density value D1) and the ground color of the back face of the document P (ground color density value D2) are the same color or are close to each other.

If $D1-\alpha \leqq D2 \leqq D1+\alpha$ holds (S14: YES), control proceeds to step S15 where the CPU 11 judges whether the first flag 13d is "1". If the first flag 13d is "1" (S15: YES), the CPU 11 sets the second flag 13e to "1" (step S16). Then, the CPU 11 executes the ground color correction by correcting the read data with the correction factor F2 (step S17). Next, the CPU 11 stores the corrected read data in an area of the line buffer 13a where the read data of the front face is stored (step S18).

On the other hand, if the first flag 13d is not "1" (S15: NO), the CPU 11 resets the second flag 13e to "0" (step S28). Then, control proceeds to step S18. That is, in this case, the CPU 11 stores the read data obtained from the 1st reading unit 6a in the area of the line butter 13a where the read data of the front face is stored, without executing correction (the ground color correction) by the correction factor F2.

That is, if the ground color of the front face of the document P (the ground color density value D2) and the ground color of the back face of the document P (the ground color density value D1) are the same color or are close to each other, and therefore the judgment result of step S14 is "YES", the ground color correction for the read data of the front face is executed when the ground color correction for the read data of the back face is executed and the ground color correction for the read data of the front face is not executed when the ground color correction for the read data of the back face is not executed.

On the other hand, If $D1-\alpha \leqq D2 \leqq D1+\alpha$ does not hold (i.e., the ground color density value D2 falls outside the ground color density value $D1\pm\alpha$) (S14: NO), the CPU 11 judges whether $Dth \leqq D2$ holds (step S26).

If $Dth \leqq D2$ holds (S26: YES), the CPU 11 sets the second flag 13e to "1" (step S16), and executes the ground color correction by correcting the read data with the correction factor F2 (step S17). Then, control proceeds to step S18.

On the other hand, if $Dth \leqq D2$ does not hold (S26: NO), the CPU 11 resets the second flag 13e to "0" (step S27). Then, control proceeds to step S18 where the CPU 11 stores the read data, for which the ground color correction with the correction factor F2 has not been performed, in the line buffer 13a.

As described above, if the ground color of the front face of the document P (the ground color density value D2) is not within the predetermined color range including the ground color of the back face of the document P (the ground color density value D2) and thereby the judgment result of step S14 is "NO", the CPU 11 decides whether to execute the ground color correction for the read data of the front face depending on whether the ground color density value D2 exceeds the threshold value Dth.

If the line read in step S11 is not the first line (S12: NO), the CPU 11 judges whether the second flag 13e is "1" (step S24). If the second flag 13e is "1" (S24: YES), the CPU 11 executes the ground color correction by correcting the read data with the correction factor F2 (step S25). Then, control proceeds to step S18 where the CPU 11 stores the corrected read data of the front face in the area of the line buffer where the read data of the front face is stored. On the other hand, if the second flag 13e is not "1" (S24: NO), control proceeds to step S18 where the CPU 11 stores the read data, for which the correction with the correction factor F2 has not been performed, in the line buffer 13a.

Next, the CPU 11 judges whether the edge of the document P being carried by the ADF 4 has moved away from the reading unit 16a and thereby the both-side reading has been finished (step S19). If the MFP 1 is not in the process of reading the front face of the document P (S10: NO), control proceeds to step S19 where the CPU 11 judges whether the reading of the document P has finished.

If the reading of the document P has not finished (S19: NO), control returns to step S1. If the reading of the document P has finished (S19:YES), the CPU 11 outputs, to the printer unit 16, the read data stored in the line buffer memory 13a, in order of the front face and the back face to execute the both-side printing (step S20).

After the printing process in step S20 has finished, the CPU 11 judges whether a document P exists on the paper feed tray 3 (step S21). If a document P exists on the paper feed tray 3 (S21: YES), control returns S1 where the CPU 11 starts carrying the document P by the ADF 4. On the other hand, if no document exists on the paper feed tray 3 (S21: NO), the CPU 11 terminates the both-side→both-side copy process.

Figure 3A:
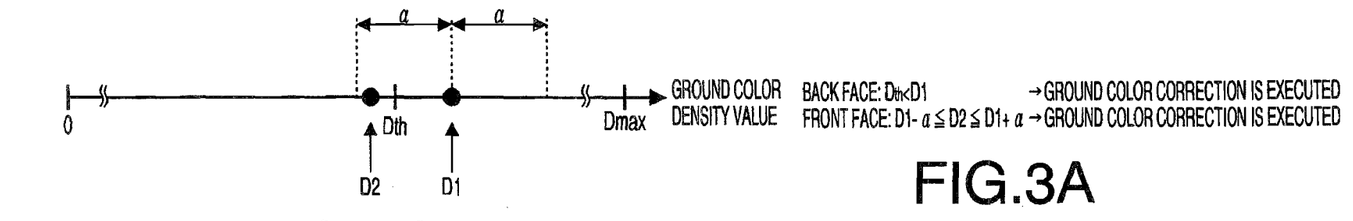
FIGS. 3A-3D are explanatory illustrations for explaining a relationship between a ground color density value of a back face of a document, a ground color density value of a front face of the document, and a status indicating whether the ground color correction is performed for each of the front and back faces of the document.
Figure 3B:
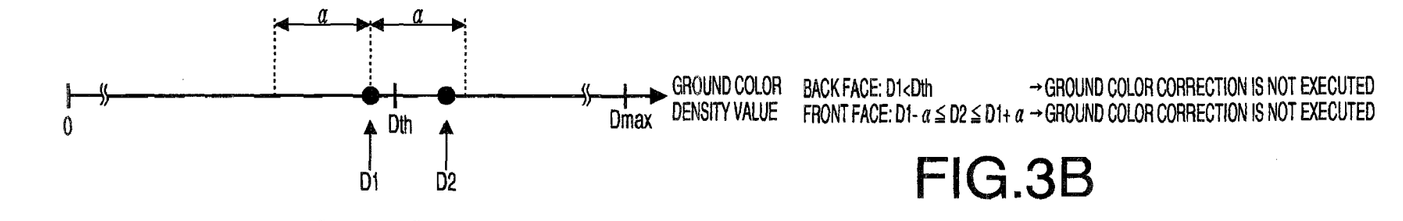

FIGS. 3A and 3B show the case where the ground color density value D2 of the front face of the document P falls within the range of (ground color density value $D1\pm\alpha$). If the ground color density value D2 falls within the range of (ground color density value $D1\pm\alpha$), whether to execute the ground color correction for the front face of the document P is decided depending on the judgment result of step S15 in FIG. 2 (i.e., depending on whether to execute the ground color correction for the back face of the document P).

For example, as shown in FIG. 3A, if the ground color density value D1 of the back face of the document P is larger than or equal to the threshold value Dth and the ground color correction for the back face is executed, the judgment result of step S15 is "YES" regardless of the magnitude relation between the ground color density value D2 and the threshold value Dth. As a result, the process of step S17 is executed. Therefore, in this case, the ground color correction for the front face of the document P is executed regardless of the fact that the ground color density value D2 is smaller than the threshold value Dth.

On the other hand, as shown in FIG. 3B, if the ground color density value D1 is smaller than the threshold value Dth and the ground color correction for the back face is not executed, the judgment result of step S15 becomes "NO" without regard to the magnitude relation between the ground color density value D2 and the threshold value Dth. As a result, the process of step S17 is not executed. Therefore, in this case, the ground color correction for the front face of the document P is not executed regardless of the fact that ground color density value D2 is larger than or equal to the threshold value Dth.

That is, according to the embodiment, if the ground color of the front face of the document P and the ground color of the back ace of the document P are the same or are close to each other, the ground color correction is executed for both of the front and back faces of the document P, or the ground color correction is not executed for the front face nor for the back face. As a result, when the both-side→both-side copy process has been executed, it becomes possible to prevent a background color of a printed image corresponding to the front face of the document P and a background color of the printed image corresponding to the back face of the document P from becoming different from each other unnaturally.

Figure 3C:
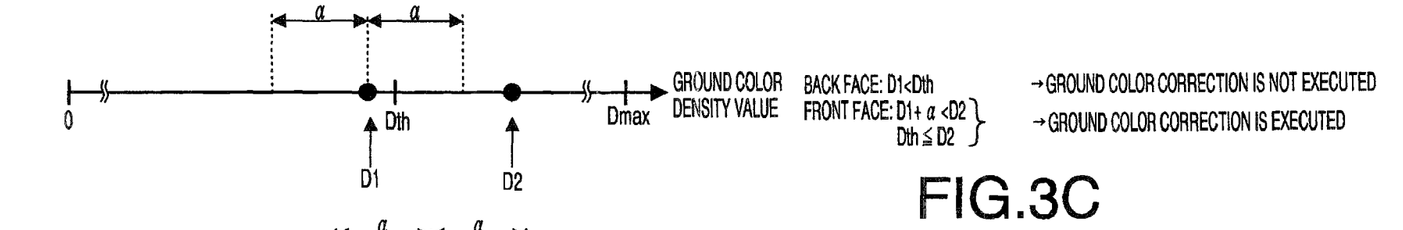
Figure 3D:
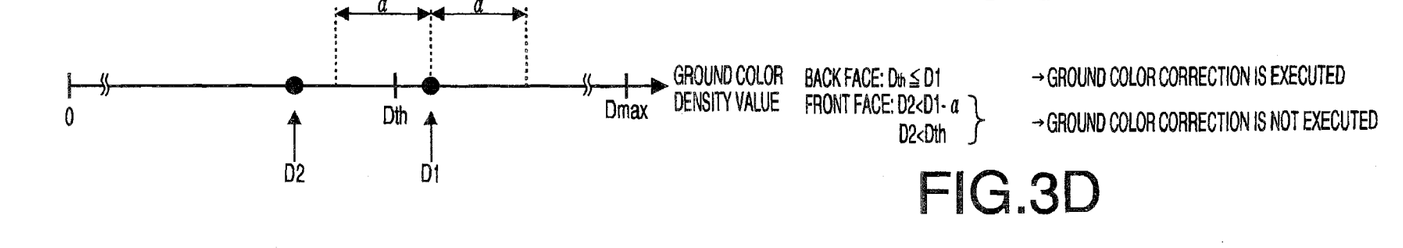

FIGS. 3C and 3D show the case where the ground color density value D2 of the front face of the document P falls outside the range of (ground color density value $D1\pm\alpha$). If the ground color density value D2 falls outside the range of $D1\pm\alpha$, the ground color correction for the front face of the document P is executed depending on the judgment result of step S26 in FIG. 2, i.e., depending on whether the ground color density value D2 is larger than or equal to the threshold value Dth.

For example, as shown in FIG. 3C, if the ground color density value D2 of the front face of the document P falls outside the range of $D1\pm\alpha$ and is larger than or equal to the threshold value Dth, the judgment result of step S26 becomes "YES". As a result, the process of step S17 is executed. Therefore, in this case, the ground color correction for the front face is executed even if the ground color density value D1 for the back face of the document P is smaller than the threshold value Dth and the ground color correction for the aback face is not executed.

As shown in FIG. 3D, if the ground color density value D2 for the front face of the document P falls outside the range of D1±α and is smaller than the threshold value Dth, the judgment result of step S26 becomes "NO". As a result, the process of step S17 is not executed, and therefore in this case, the ground color correction for the front face is not executed even if the ground color density value D1 of the back face of the document P is larger than or equal to the threshold value Dth and the ground color correction fro the back face is executed.

That is, according to the first embodiment, if the ground color of the front face of the document P and the ground color of the back face of the document P are different from each other in such a manner that the ground color of the front face exceeds a predetermined range with respect to the ground color of the back face, whether to execute the ground color correction for the front face is determined regardless of whether to execute the ground color correction for the back face. Therefore, it becomes possible to obtain a double-side printed medium where a ground color specific to the front face of the document P and a ground color specific to the back face of the document P are excellently expressed.

Second Embodiment

Hereafter, a second embodiment is described with reference to FIG. 4. In the above described first embodiment, the both-side printing (the both-side→both-side copy process) is executed from the read data of both sides of one document P. In the second embodiment, the both-side printing (a single-side→both side copy process) is executed from read data of two sheets of documents P. In the following, to elements which are substantially the same as those of the first embodiment, the same reference numbers are assigned, and explanations thereof will not be repeated for the sake of simplicity.

The single-side→both side copy process is executed by reading the front face of the document P being carried by the ADF 4 through the 1st reading unit 6a. Specifically, the single-side→both side copy process is executed such that read data of an odd number-th document and read data of an even number-th document are respectively printed on both sides of a recording medium (e.g., a sheet of paper). The single-side→both side copy process is executed by the image reading program 12a.

Figure 4:
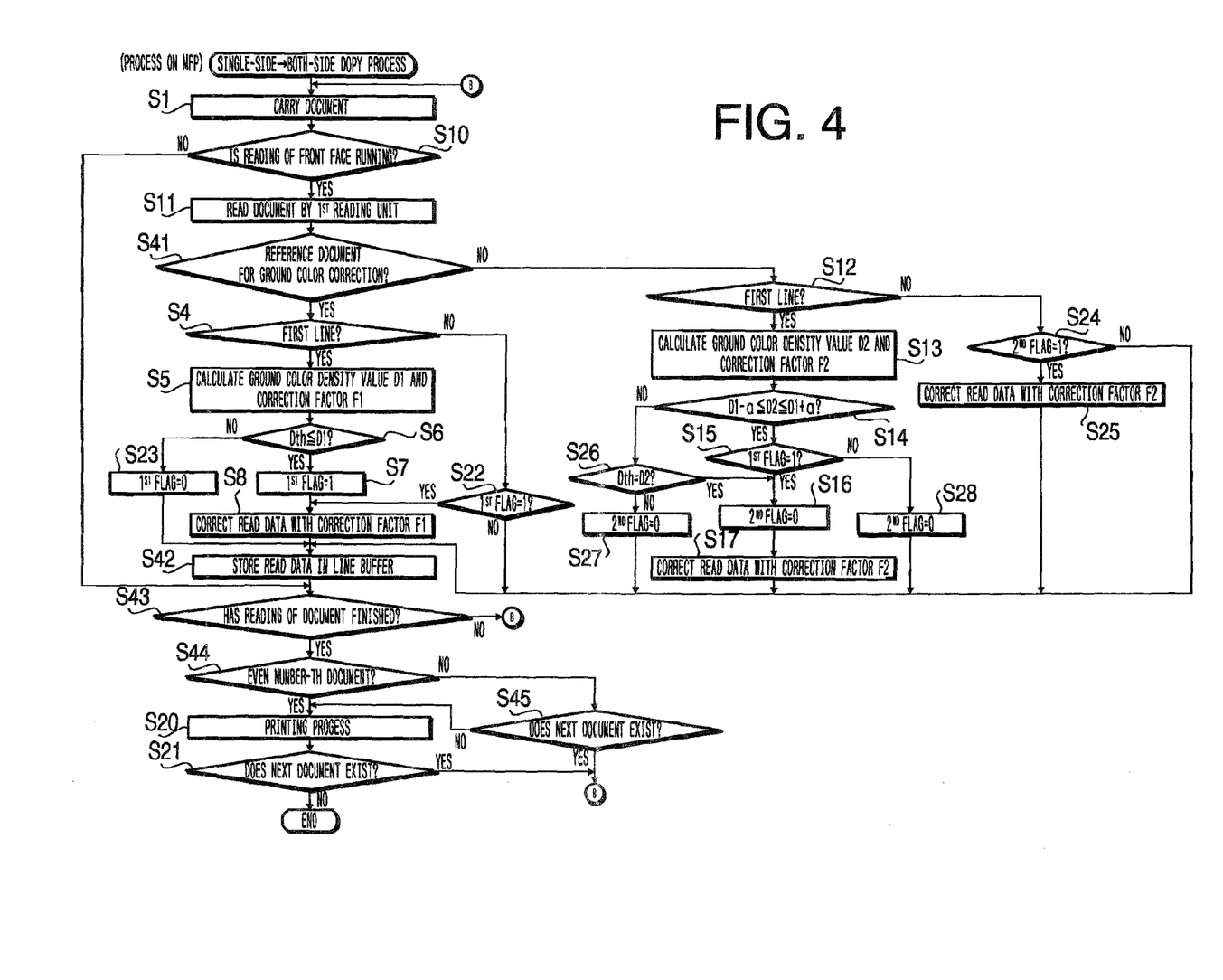
FIG. 4 is a flowchart of a single-side→both-side copy process to be executed under control of the CPU of the MFP.

The single-side→both side copy process shown in FIG. 4 is executed when an execution command for single-side→both-side copy is inputted by a user through the operation panel 17 or an execution command for single-side→both-side copy is inputted from an external device through the interface 18. First, the CPU 11 starts to carry the document P placed on the paper feed tray 3 through the ADF 4 (step S1). Then, the CPU 11 judges whether the front face of the document P is being read (step S10). Then, the CPU 11 reads the front face of the document P for one line through the 1st reading unit 6a.

Then, the CPU 11 judges whether the document P being read by the 1st reading unit 6a is a reference document to be defined as a reference for ground color correction (step S41). In this embodiment, an odd-number-th document (i.e., the first document, the third document, . . . (an+1)-th document; where n is an integer ≧0) is defined as the reference document.

If the document P being read is the reference document (S41: YES), the CPU 11 judges whether the line read in step S11 is the first line (step S4). If the line read in step S11 is the first line (S4: YES), the CPU 11 stores the ground color density value D1 and the correction factor F1 calculated in step S5 in the reference ground color density memory 13b and the correction factor memory 13c.

Then, the CPU 11 judges whether (the threshold value Dth≦the ground color density value D1) holds (step S6). If the judgment result of S6 is "YES", the CPU 11 processes steps S7 and S8. Then, the CPU 11 stores the read data for which the ground color correction has been executed, in the line buffer 13a (step S42). In this case, if the document P being read is the odd-number-th document, the CPU 11 stores the read data in a front-face data area of the line buffer 13a. On the hand, if the document P being read is an even number-th document, the CPU 11 stores the read data in a back-face data area of the line buffer 13a.

If the judgment result of step S6 is "NO", the CPU 11 resets the first flag 13d to "0" (step S23). Then, control proceeds to step 42. That is, if (the threshold value Dth>the ground color density value D1) holds, the CPU 11 stores the read data obtained from the reading unit 16a in the line buffer 13a, without executing the ground color correction by the correction factor F1.

If the line being read is not the first line (S4: NO), the CPU 11 judges whether the first flag 13d is "1" (step S22). If the first flag is "1" (S22: YES), control proceeds to step S8. If the first flag 13d is not "1" (S22: NO), control proceeds to step S42 without executing the ground color correction.

If the document P being read is not the reference document (S41: NO), the CPU 11 judges whether the line read in step S11 is the first line (step S12). If the line read in step S11 is the first line (S12: YES), control proceeds to step S13 where the CPU 11 stores the correction factor F2 in the correction factor memory 13c.

Then, the CPU 11 judges whether the ground color density value D2 falls within the (ground color density value D1±α). That is, the CPU 11 judges whether D1−α≦D2≦D1+α holds (step S14). If D1−α≦D2≦D1+α holds (S14: YES), the CPU 11 judges whether the first flag 13d is "1" (step S15).

If the first flag 13d is "1" (S15: YES), the CPU 11 processes the steps S16 and S17. Then, control proceeds to step S42 where the CPU 11 stores the read data for which the ground color correction has been executed, in the line buffer 13a. On the other hand, if the first flag 13d is not "1" (S15: NO), the CPU 11 processes step S28. Then, control proceeds to step S42 without executing the ground color correction.

If D1−α≦D2≦D1+α does not hold (S14: NO), the CPU 11 judges whether Dth≦D2 hold (step S26). If Dth≦D2 holds (S26: YES), control proceeds to step S42 after steps S16 and S17 are processed. If Dth≦D2 does not hold (S26: NO), control proceeds to step S42 after step S27 is processed.

If the line read in step S11 is not the first line (S12: NO), the CPU 11 judges whether the second flag 13e is "1" (step S24). If the second flag 13e is "1" (S24: YES), control proceeds to step S42 after step S25 is processed. In step S25, the read data for which the ground color correction has been executed, is stored into the line buffer 13a. On the other hand, if the second flag 13e is not "1" (S24: NO), control proceeds to step S42 without executing the ground color correction.

After step S42 is processed, the CPU 11 judges whether the edge of the document P has moved away from the 1st reading unit 6a and the reading of the document P has finished (step S43).

If it is judged in step S10 that reading of the front face of the document P is not running (S10: NO), control proceeds to step S43 where the CPU 11 judges whether reading of the document P has finished.

If the reading of the document P has not finished (S43: NO), control returns to step S1. If the reading of the document P has finished (S43: YES), the CPU 11 judges whether the document for which the reading has finished is an even-number-th document (i.e., the second document, the fourth document, . . . 2(n+1)-th document; where n is an integer ≧0) (step S44). If the document for which the reading has finished is an even-number-th document (S44: YES), the CPU 11 outputs the read data stored in the line buffer 13*a* in the order of print data for the front-face and print data for the back-face to achieve the both-side printing on a recording medium (step S20).

After step S20 is processed, the CPU 11 judges whether a next document P exists on the paper feed tray 3 (step S21). If a next document P exits on the paper feed tray 3 (S21: YES), control returns to step S1 to start carrying the next document P through the ADF 4. If a next document does not exist (S21: NO), the both-side→both-side copy process terminates.

If the document for which the reading has finished is not an even-number-th document (i.e., the document for which the reading has finished is an odd number-th document) (S44: NO), the CPU 11 judges whether a next document P exists on the paper feed tray 3 as in the case of step S21 (step S45). If a next document exists on the paper feed tray 3 (S45: YES), control returns to step S1 to start carrying the next document P through the ADF 4. If no document exists on the paper feed tray 3 (S21: NO), control returns to step S 20 where the CPU 11 outputs the read data for the front data stored in the line buffer 13*a* to the printer unit 16, and executes the printing on the recording medium.

As described above, according to the second embodiment, in the case where a both-side printed medium is produced from two sheets of documents P, the ground color correction is executed for both of an odd number-th document and an even number-th document or the ground color correction is not performed for an odd number-th document nor for an even number-th document if the ground color of the odd number-th document and the ground color of the even number-th document are the same or are close to each other within the predetermined range. On the other hand, in the case where the ground color of an odd number-th document falls outside the predetermined range with respect to the ground color of an even number-th document, whether to execute the ground color correction for the odd number-th document (which is printed as a front face of a printed medium) and whether to execute the ground color correction for an even number-th document (which is printed as a back face of the printed medium) are determined independently based on the respective ground colors.

Such a configuration makes it possible to prevent a background color of a printed image corresponding to the front face of a double side printed medium and a background color of the printed image corresponding to the back face of the double side printed medium from becoming different from each other unnaturally. Consequently, it becomes possible to form natural printed images corresponding to ground colors of documents P on both sides of a recording medium.

Although the present invention has been described in considerable detail with reference to certain preferred embodiments thereof, other embodiments are possible.

In the above described second embodiment, since the odd number-th document is defined as the reference document for ground color correction, the judgment step S41 of the single-side→both side copy process (FIG. 4) is processed such that the judgment result for the odd number-th document is "YES" and the judgment result for the even number-th document is "NO". That is, whether to execute the ground color correction for the even number-th document is determined based on an immediately previous document.

In contrast to the above described configuration of the second embodiment, a particular document (e.g., the first document) may be defined as the reference document for ground color correction so that whether to execute the ground color correction for documents to be read after reading of the first document may be determined based on the ground color correction for the first document. In this case, the single-side→both side copy process shown in FIG. 4 can be utilized. That is, in this case, the judgment result of step S41 becomes "YES" for the first document, and the judgment result of step S41 becomes "NO" for each document from the second document.

In the above described embodiments, the both-side copy is executed for the document P being carried by the ADF 4. However, the both-side copy may be executed for the document P placed on the document base 2. For example, read data obtained by the odd number-th time reading may be defined as the reference for ground color correction, and in this case whether to execute the ground color correction for read data obtained by the even number-th time reading may be determined depending on the ground color correction for the odd number-th time reading.

In the above described embodiments, the MFP 1 is configured to have two reading units (6*a* and 6*b*). However, the above described processes according to the embodiments may be applied to a reading device configured to have a single reading unit and to read both sides of a document by reversing the document after reading of one side (e.g., a front face) of the document is finished. In this case, whether to execute the ground color correction for the other side (e.g., a back face) of the document may be determined depending on execution of the ground color correction for the one side (e.g., the front face) of the document.

In the above described embodiments, each of the ground color density values D1 and D2 is obtained by extracting a predetermined number of pixels (e.g., 16 pixels) from all of the pixels on the first line of the read data in decreasing order of density values and by calculating an average of the density values of the extracted pixels. However, the density values D1 and D2 may be obtained in various ways. For example, the density value may be obtained from the entire read data of a document.

It should be understood that the both-side→both-side copy process and the single-side→both-side copy process may be executed in a monochrome copying mode and in a color copying mode.

Steps S4-S8, S22, S23, S12-S17 and S24-S28 of the both-side→both-side copy process and the single-side→both-side copy process may be executed only when settings for executing the ground color correction have been made.

What is claimed is:

1. An image reading device, comprising:
a carrying unit configured to carry a document;
a reading unit configured to read the document being carried by the carrying unit;
a first density value obtaining unit configured to obtain a first value representing a ground color of a first face of the document based on image data obtained by the reading unit by reading the first face of the document;
a first judgment unit configured to judge whether to execute correction for the ground color of the image data corresponding to the first face of the document based on the first value and a predetermined threshold value;
a first ground color correction unit configured to correct the ground color of the image data corresponding to the first face with a first correction value responsive to the first value if the first judgment unit judges to execute the correction;

a second density value obtaining unit configured to obtain a second value representing a ground color of a second face of the document based on image data obtained by the reading unit by reading the second face of the document;

a second judgment unit configured to judge whether the second value falls within a predetermined range including the first value;

a third judgment unit configured to judge whether to execute correction for the ground color of the image data corresponding to the second face of the document in accordance with a judgment result by the first judgment unit if the second judgment unit judges that the second value falls within the predetermined range; and a second ground color correction unit configured to correct the ground color of the image data corresponding to the second face with a second correction value responsive to the second value if the third judgment unit judges to execute the correction, wherein the third judgment unit judges to execute the correction for the ground color of the image data corresponding to the second face of the document if the first judgment unit judges to execute the correction for the ground color of the image data corresponding to the first face of the document, and the third judgment unit judges not to execute the correction for the ground color of the image data corresponding to the second face of the document if the first judgment unit judges not to execute the correction for the ground color of the image data corresponding to the first face of the document.

2. The image reading device according to claim 1, wherein:

the first density value obtaining unit obtains the first value representing the ground color of the first face of the document based on the image data obtained by reading a predetermined area on the first face of the document; and the second density value obtaining unit obtains the second value representing the ground color of the second face of the document based on the image data obtained by reading a predetermined area on the second face of the document.

3. The image reading device according to claim 1, further comprising:

a fourth judgment unit configured to judge whether to execute the correction for the ground color of the image data corresponding to the second face of the document based on the second value and the predetermined threshold if the second judgment unit judges that the second value falls outside the predetermined range; and a third ground color correction unit configured to correct the ground color of the image data corresponding to the second face with the second correction value responsive to the second value if the fourth judgment unit judges to execute the correction.

4. The image reading device according to claim 1, wherein the reading unit comprises:

a first reading sensor arranged to read the first face of the document; and a second reading sensor that is arranged separately from the first reading sensor to read the second face of the document.

5. A method to be implemented on an image reading device, comprising the steps of:

obtaining a first value representing a ground color of a first face of a document based on image data obtained by reading a first face of the document;

first judging whether to execute correction for the ground color of the image data corresponding to the first face of the document based on the first value and a predetermined threshold value;

correcting the ground color of the image data corresponding to the first face with a first correction value responsive to the first value if it is judged in the first judging step that the correction for the ground color of the image data corresponding to the first face should be executed;

obtaining a second value representing a ground color of a second face of the document based on image data obtained by reading the second face of the document;

second judging whether the second value falls within a predetermined range including the first value;

third judging whether to execute correction for the ground color of the image data corresponding to the second face of the document in accordance with a judgment result of the first judging step if it is judged in the second judging step that the second value falls within the predetermined range; and correcting the ground color of the image data corresponding to the second face with a second correction value responsive to the second value if it is judged in the third judging step that the correction for the ground color of the image data corresponding to the second face should be executed, wherein, in the third judging step, it is judged that the correction for the ground color of the image data corresponding to the second face of the document should be executed if it is judged in the first judging step to execute the correction for the ground color of the image data corresponding to the first face of the document, and it is judged that the correction for the ground color of the image data corresponding to the second face of the document should not be executed if it is judged in the first judging step not to execute the correction for the ground color of the image data corresponding to the first face of the document.

6. The method according to claim 5, wherein:

the first value representing the ground color of the first face of the document is obtained based on the image data obtained by reading a predetermined area on the first face of the document; and the second density value obtaining unit obtains the second value representing the ground color of the second face of the document is obtained based on the image data obtained by reading a predetermined area on the second face of the document.

7. The method according to claim 5, further comprising the steps of:

fourth judging whether to execute the correction for the ground color of the image data corresponding to the second face of the document based on the second value and the predetermined threshold if it is judged in the second judging step that the second value falls outside the predetermined range; and correcting the ground color of the image data corresponding to the second face with the second correction value responsive to the second value if it is judged in the fourth judging step to execute the correction.

8. The method according to claim 5,
wherein the image reading device comprises:
a first reading sensor arranged to read the first face of the document; and
a second reading sensor that is arranged separately from the first reading sensor to read the second face of the document,
wherein:
the obtaining step of obtaining the first value is executed through the first reading sensor; and
the obtaining step of obtaining the second value is executed through the second reading sensor.

9. A computer readable storage device having computer readable instruction stored thereon, which, when executed by a processor of an image reading device, configures the processor to perform the steps of:
obtaining a first value representing a ground color of a first face of a document based on image data obtained by reading a first face of the document;
first judging whether to execute correction for the ground color of the image data corresponding to the first face of the document based on the first value and a predetermined threshold value;
correcting the ground color of the image data corresponding to the first face with a first correction value responsive to the first value if it is judged in the first judging step that the correction for the ground color of the image data corresponding to the first face should be executed;
obtaining a second value representing a ground color of a second face of the document based on image data obtained by reading the second face of the document;
second judging whether the second value falls within a predetermined range including the first value;
third judging whether to execute correction for the ground color of the image data corresponding to the second face of the document in accordance with a judgment result of the first judging step if it is judged in the second judging step that the second value falls within the predetermined range; and
correcting the ground color of the image data corresponding to the second face with a second correction value responsive to the second value if it is judged in the third judging step that the correction for the ground color of the image data corresponding to the second face should be executed,
wherein, in the third judging step, it is judged that the correction for the ground color of the image data corresponding to the second face of the document should be executed if it is judged in the first judging step to execute the correction for the ground color of the image data corresponding to the first face of the document, and it is judged that the correction for the ground color of the image data corresponding to the second face of the document should not be executed if it is judged in the first judging step not to execute the correction for the ground color of the image data corresponding to the first face of the document.

10. The computer readable storage device according to claim 9,
wherein:
the first value representing the ground color of the first face of the document is obtained based on the image data obtained by reading a predetermined area on the first face of the document; and
the second density value obtaining unit obtains the second value representing the ground color of the second face of the document is obtained based on the image data obtained by reading a predetermined area on the second face of the document.

11. The computer readable storage device according to claim 9,
further comprising the steps of:
fourth judging whether to execute the correction for the ground color of the image data corresponding to the second face of the document based on the second value and the predetermined threshold if it is judged in the second judging step that the second value falls outside the predetermined range; and
correcting the ground color of the image data corresponding to the second face with the second correction value responsive to the second value if it is judged in the fourth judging step to execute the correction.

12. The computer readable storage device according to claim 9,
wherein the image reading device comprises:
a first reading sensor arranged to read the first face of the document; and
a second reading sensor that is arranged separately from the first reading sensor to read the second face of the document,
wherein:
the obtaining step of obtaining the first value is executed through the first reading sensor; and
the obtaining step of obtaining the second value is executed through the second reading sensor.

* * * * *